United States Patent Office 3,180,703
Patented Apr. 27, 1965

3,180,703
RECOVERY PROCESS
Arthur E. Ableson and Robert J. Woody, Grants, N. Mex., and Mayer B. Goren, Golden, Colo., assignors to Kerr-McGee Oil Industries, Inc., a corporation of Delaware
No Drawing. Filed Jan. 15, 1963, Ser. No. 251,479
15 Claims. (Cl. 23—14.5)

This invention broadly relates to recovery of molybdenum values from various source materials. In one of its more specific aspects, the invention relates to the precipitation of a molybdenum-containing product from aqueous solutions containing molybdenum values.

Molybdenum is often found as a contaminant of uranium-bearing ores and in some ores such as uraniferous lignite, the molybdenum content may exceed the uranium content. At least a portion of the molybdenum content of the ore is dissolved during either acid or alkaline leaching of the uranium and is present in solution in the resulting leach liquors. Almost without exception, the molybdenum will in some way interfere with the uranium recovery and in many instances appears as an udesirable contaminant in the final uranium product produced from the uranium-bearing liquor.

Molybdenum, either as a molybdate or as a molybdenum-containing anionic complex, is an important interfering element in processes using an anion exchange resin for the recovery of uranium from aqueous solution. In such instances, molybdenum is irreversibly absorbed on the anion exchange resin and this results in a steady loss in the capacity of the resin for uranium values. Elaborate leach liquor purification processes and resin regeneration processes have been developed to make more feasible the processing of molybdenum-containing uranium ores. Molybdenum is also an interfering element in the processing of uranium ores by liquid solvent extraction processes in instances where the original ore contains molybdenum. This is true when the solvent extractant is an amine, alkyl or dialkyl phosphate, or other organic solvent extractant for uranium capable of absorbing molybdenum.

In instances where organic amine solvent extractants are used for the recovery of uranium from molybdenum-containing leach liquors, a high molecular weight secondary or tertiary amine such as trilauryl amine in kerosene solution may be used to extract the uranium as an anionic sulfate complex. Molybdenum present in the leach liquor is also extracted at the same time and is present in the resultant uranium-loaded solvent extractant. In the usual stripping operation with neutral or acidic 1-2 normal aqueous sodium chloride, the molybdenum is incompletely stripped and eventually builds up in the amine solvent extractant to intolerable levels unless it is removed in some manner. This leads to molybdenum poisoning of the solvent extractant with accompanying loss of capacity for uranium. Also, the organic amine-molybdate complex has a tendency to separate from the solution of the solvent extractant as an insoluble gummy phase which is suspended in the organic carrier. In order to prevent this from occurring, the uranium-stripped amine solvent extractant is wholly or partially rejuvenated to remove the molybdenum content by intimate contact with an aqueous alkaline solution. The aqueous alkaline solution used in rejuvenating the amine solvent extractant may be made alkaline with sodium carbonate, sodium hydroxide, ammonium carbonate, ammonium hydroxide, potassium carbonate, potassium hydroxide and mixtures thereof. If desired, simple water soluble metal halide or nitrate salts also may be present in solution. For reasons of economy, usually an ammonium hydroxide-sodium carbonate mixture is preferred. In the case of molybdenum-poisoned ion exchange resins, rejuvenation with an alkaline solution such as aqueous sodium chloride or sodium nitrate made alkaline with one of the above-mentioned substances effects restoration of the resin to an improved operating level and an alkaline molybdenum-containing liquor is obtained.

In view of the above, it is apparent that a by-product alkaline strip liquor relatively concentrated in molybdenum values is obtained when processing acidic leach liquors containing molybdenum values as an impurity by ion exchange or solvent extraction. The prior art has recognized the desirability of recovering molybdenum values from such alkaline strip liquors and elaborate processes for achieving this end have been proposed. However, the prior art processes have inherent disadvantages which render them impractical from a commercial standpoint and the art has long sought a convenient, inexpensive method of recovering molybdenum values from alkaline solution.

It is an object of the present invention to provide a novel process for the precipitation of a molybdenum-containing product from alkaline solutions containing molybdenum values.

It is a further object to provide a novel process for the recovery of molybdenum values present in molybdenum-poisoned ion exchange resin or organic solvent extractants for desired metal values.

It is still a further object to provide a novel process for precipitating a molybdenum-containing product from aqueous alkaline solutions derived from the rejuvenation of molybdenum poisoned ion exchange resins and organic solvent extractants.

It is still a further object to provide a novel process for stripping desired metal values from ion exchange resins or organic solvent extractants using the molybdenum-barren liquor remaining upon recovery of a molybdenum product in accordance with the present invention.

Still other objects and advantages of the invention will be apparent to those skilled in the art upon reference to the following detailed description and the examples.

In the discussion hereinafter, reference will be made to the recovery of uranium values by a process involving acid or alkaline leaching of molybdenum-containing ore to solubilize the desired uranium values, followed by absorption of the dissolved uranium values from acidic aqueous solution employing a conventional ion exchange resin or organic solvent extractant, and stripping of the uranium values from the loaded ion exchange resin or solvent extractant employing a neutral to acidic stripping solution. Under these conditions, the molybdenum is concentrated in the ion exchange resin or solvent extractant and it is not removed completely during the normal stripping operation for stripping the uranium values. It is necessary to periodically rejuvenate the uranium stripped ion exchange resin or stripped solvent extractant with an alkaline solution as mentioned herein for the purpose of removing molybdenum. The resulting alkaline solution containing molybdenum values may be used in practicing the present invention.

The recovery of uranium from molybdenum-containing source materials is specifically described and illustrated herein in the interest of convenience and clarity. It will be recognized by those skilled in the art that the invention is equally applicable to the recovery of other desired metal values in instances where molybdenum poisoning of the ion exchange resin or solvent extractant is encountered and rejuvenation results in a strip solution containing dissolved molybdenum values.

It is also possible to provide other sources of molybdenum-containing liquors which are satisfactory for processing in accordance with the present invention. For instance, a molybdenum-containing ore may be leached before or after roasting to solubilize the molybdenum values and provide an aqueous solution from which a molybdenum-containing product may be precipitated in high yield by the process described hereinafter. The source of the aqueous solution of molybdenum values is not critical but the precipitating conditions defined hereinafter which are necessary for the recovery of a molybdenum-containing product is accordance with the present invention must be present.

In accordance with the present invention, a molybdenum-containing product is precipitated from a aqueous solution containing dissolved molybdenum values under critical conditions of pH, and dissolved phosphate and ammonium ion content. The solution should contain a source of phosphate ion such as phosphoric acid, $P_2O_5$, or other substances yielding phosphate ion in acidic solution. The gram atomic weight ratio of phosphorus present in the phosphate ion to molybdenum present in the molybdenum values is at least 1:15 and preferably 1:12, but not more than about 1:6 as excess phosphate is detrimental to complete precipitation. The solution also contains a convenient source of ammonium ion, such as dissolved ammonium chloride, ammonium carbonate, ammonium sulfate or other water-soluble ammonium salts providing ammonium ion in acidic solution. The gram atomic weight ratio of nitrogen present in the ammonium ion to molybdenum present in the molybdenum values should be at least 1:4 and preferably higher such as 50:1 to 100:1. There is no upper limit on the amount of ammonium ion which may be present up to the point of saturation and a large excess of ammonium ion is usually preferred. The pH of the solution should be from about 0.5 to about 2, and preferably from about 1 to about 1.5. Any suitable acid may be used to achieve the desired pH when the solution is alkaline initially, such as hydrochloric or sulfuric acid.

It is preferred to warm the solution and maintain it at a temperature between about 30° C. and the boiling point for a period of time sufficient to precipitate the molybdenum-containing product. Excellent results are usually obtained within the above temperature range over a period of 1 to 4 hours with gentle agitation.

Precipitation under the preferred conditions usually results in almost quantitative recovery of the molybdenum values as a product containing at least 75% $MoO_3$ which is easily filtered, washed and dried. This is accomplished without a costly evaporation step or upgrading the resultant molybdenum-containing product.

It has been further discovered that the mother liquor remaining after precipitation of the molybdenum-containing product is an excellent stripping agent. In one variant, the molybdenum-barren aqueous liquor may be used in stripping desired metal values from the ion exchange resin or organic solvent extractant.

A wide variety of organic solvent extractants which are known to be satisfactory for recovering uranium and other metal values from aqueous solution may be used in preparing molybdenum-containing solutions. Organic solvent extractants include organo-phosphorus compounds, such as mono-organophosphoric acid esters of the general formula

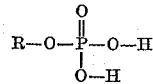

diorgano-phosphoric acid esters of the general formula

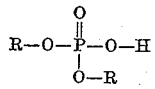

organo-pyrophosphates of the general formula

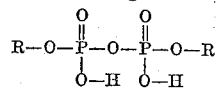

organo-phosphonic acids of the general formula

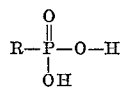

and diorgano-phosphinic acids of the general formula

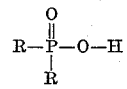

where R is a monovalent organic radical selected from the group consisting of alkyl radicals, cycloalkyl radicals, aryl radicals, and aralkyl radicals. The organo-phosphorus compound should contain at least 8 carbon atoms and usually for better results 16 to 20 carbon atoms. Preferably, the organo-radical should contain at least 6 carbon atoms and for best results at least 8 carbon atoms, but often up to 12-16 or 20 carbon atoms are satisfactory.

A wide variety of amine solvent extractants for uranium and other metal values may be used including high molecular weight alkyl substituted amines such as tri-n-alkyl amines where the alkyl groups have at least 6 carbon atoms per alkyl group, di-alkyl amines where the substituent alkyl groups have from about 8–10 up to about 20–30 carbon atoms, and mono-alkyl amines having molecular weights of about 250–300, e.g., up to about 18–30 carbon atoms in the alkyl substituent. The alkyl substituents may be normal or extensively branched, the latter generally conferring better solvent solubility to the amine and its complexes in the organic diluent or carrier.

The solvent extractants are usually dissolved in an organic solvent. For instance, about 1–30 and preferably about 5–10% of the solvent extractant may be dissolved in one or more suitable water immiscible organic solvents such as high flash point kerosene, benzene, naphtha, chlorinated solvents, etc. If desired, a solubilizing additive may be present such as isodecanol, dodecanol, tributyl phosphate, etc.

Ion exchange resins for recovering uranium and other desired metal values are likewise well known to the art and may be selected for use in preparing molybdenum-containing liquors in accordance with the invention. While materials known in the art as weak base, intermediate base and strong base ion exchange resins may be used, strongly basic, aromatic anion exchange resins containing quaternary ammonium groups are usually preferred.

The foregoing detailed description and the following specific examples are for purposes of illustration only and are not intended as being limiting to the spirit or scope of the appended claims.

*Example I*

This example illustrates the preparation of a strip liquor containing molybdenum values.

A uranium leach liquor derived by acid leaching of uranium ore found in the Ambrosia Lake region of New Mexico contains 0.1–1 g./l. of uranium values calculated as $U_3O_8$ and 0.02–0.04 g./l. of molybdenum values calculated as Mo. The leach liquor is extracted with a kerosene solution of a high molecular weight trifatty amine (5–10% trilauryl amine). The loaded organic solvent contains 0.08–0.1 g./l. of molybdenum values calculated as Mo and about 2.5 g./l. of uranium values calculated as $U_3O_8$, which is reduced to 0.04–0.05 g./l. of Mo and 0.002–0.006 g./l. of $U_3O_8$ after a sodium chloride stripping operation. Not all of the increment of molybdenum values appears in the chloride strip liquor, as a portion is present as a kerosene insoluble organic sludge which is in suspension in the organic phase.

For the purpose of freeing the uranium depleted solvent of its contained molybdenum, the stripped solvent is fed into one of a series of mixer-settlers where it is intimately contacted with about 1/50 of its volume of an alkaline aqueous ammonia-sodium carbonate solution. The alkaline reagent is prepared by feeding a small amount of sodium carbonate, steam and anhydrous ammonia directly to one or more of the mixer stages where the steam condenses and the ammonia-soda ash mixture dissolves. Alternatively, the aqueous alkaline stripping solution may be prepared externally to the mixer and fed thereto and/or the steam may be eliminated and heating of the mixer contents may be achieved by heating coils arranged within the mixer. The alkaline solution may contain 2–5% of the alkali requirements as sodium carbonate and the remainder may be anhydrous ammonia, and enough total alkali is provided to yield a final strip liquor having a pH of about 8–8.5.

Under the above conditions, the amine solvent extractant is converted to the free base and is stripped of its anions which appear in the aqueous phase. Condensing of steam as the source of water warms the strip circuit to about 120° F. and improves efficiency and phase disengagement. The small amount of soda ash is for the purpose of providing enough carbonate ion to prevent precipitation of a small amount of uranium which is usually present.

A typical molybdenum strip liquor may contain 0.03–0.05 g./l. of uranium values calculated as $U_3O_8$, 2–6 g./l. of molybdenum values calculated as Mo 30–45 g./l. of $NH_4^+$, 70–100 g./l. of $Cl^-$, 0.1–0.3 g./l. of phosphorus values calculated as $P_2O_5$ and has a pH of 8–8.5.

*Example II*

The molybdenum strip liquor used in this example was prepared in accordance with the general procedure of Example I. The strip liquor contained 3.66 g./l. of molybdenum values (Mo) and 0.1 g./l. of phosphate values ($PO_4$). The gram atomic weight ratio of nitrogen present in the ammonium ion to molybdenum present in the molybdenum values was above 1:4.

The pH value of the alkaline liquor was adjusted to 1.2 with sulfuric acid and varying amounts of phosphoric acid were added incrementally to portions of the strip liquor. The so treated portions of liquor were heated under reflux and near the boiling point for about 4 hours and the precipitated product was collected. The product contained above 75% by weight $MoO_3$ and was largely ammonium phosphomolybdate.

The following data were obtained:

| Percent of Molybdenum Precipitated | Lbs. of Phosphoric Acid Added per Ton of Strip Solution |
|---|---|
| 79 | 0.0 |
| 99.5 | 0.09 |
| 99 | 0.18 |
| 98.75 | 0.36 |
| 97.5 | 0.72 |
| 91.5 | 1.08 |

*Example III*

Mother liquor following molybdenum precipitation as in Example II contains a small amount of uranium and is concentrated in ammonium chloride (about 2–3 normal). This molybdenum-barren solution may be used as such or in combination with other salt solutions as the reagent for stripping uranium from a loaded amine solvent used in solvent extraction processes.

A uranium extraction solvent which was a 0.05 molar solution of a mixed trialkyl amine in kerosene solution was contacted with a uranium bearing leach liquor until loaded with uranium. The alkyl groups of the amine contained an average of about 8 to 10 carbon atoms. Portions of the uranium loaded amine were then stripped at varying phase ratios with the mother liquor obtained from molybdenum precipitation as illustrated in Example II, and other portions were stripped at varying phase ratios with a standard stripping solution which is 1.5 normal sodium chloride solution. Data obtained by analyzing the aqueous and stripped organic phases in equilibrium in a series of phase ratios showed that the stripping coefficients for the molybdenum barrens are much higher than for the 1.5 normal sodium chloride solution. Thus, the molybdenum barren solution is a more effective stripping agent than is 1.5 molar sodium chloride, which is the usual stripping solution.

What is claimed is:

1. A process for recovering molybdenum values from aqueous solution comprising precipitating a molybdenum-containing product from an aqueous solution containing dissolved molybdenum values, the molybdenum-containing product being precipitated from the said solution in the presence of dissolved ammonium values present as ammonium ion and dissolved phosphorus values present as phosphate ion by adjusting the solution to provide a gram atomic weight ratio of phosphorus contained in the said phosphorus values to molybdenum contained in the said molybdenum values of at least 1:15 and not more than about 1:6, a gram atomic weight ratio of nitrogen contained in the said ammonium values to molybdenum contained in the said molybdenum values above 1:4 and a pH value of the solution between about 0.5 and about 2, the said solution requiring adjustment initially to provide at least one of the said ratio of phosphorus to molybdenum, said ratio of nitrogen to molybdenum and said pH value of the solution.

2. The process of claim 1 wherein the gram atomic weight ratio of nitrogen contained in the said ammonium values to molybdenum contained in the said molybdenum values is at least 50:1.

3. The process of claim 1 wherein the gram atomic weight ratio of phosphorus in the said phosphorus values to molybdenum in the said molybdenum values is at least 1:12.

4. The process of claim 1 wherein the pH of the solution is about 1–1.5.

5. The process of claim 1 wherein the temperature of the solution is between about 30° C. and the boiling point.

6. The process of claim 1 wherein the gram atomic weight ratio of nitrogen contained in the said ammonium values to molybdenum contained in the said molybdenum values is at least 50:1, the gram atomic weight ratio of phosphorus in the said phosphorus values to molybdenum in the said molybdenum values is at least 1:12, the pH of the solution is about 1–1.5 and the temperature of the solution is between about 30° C. and the boiling point.

7. A process for the recovery of desired metal values from an acidic aqueous solution containing the same and molybdenum values comprising intimately contacting the said solution with at least one substance selected from the group consisting of ion exchange resins and organic solvent extractants for the desired metal values to thereby absorb the desired metal values, the said substance also absorbing molybdenum values, separating the said substance together with the absorbed metal values from the said solution, thereafter intimately contacting the said substance with a neutral to acidic aqueous stripping solution for the desired metal values to strip the desired metal values therefrom without completely removing the molybdenum values, thereafter separating the said substance containing molybdenum values from the stripping solution, intimately contacting the said substance after separation from the stripping solution with an aqueous alkaline solution containing at least one material selected from the group consisting of sodium, potassium and ammonium hydroxides and carbonates to strip molybdenum values therefrom and produce an aqueous solution containing dissolved molybdenum values, separating the said alkaline solution containing dissolved molybdenum values from the said substance, recovering molybdenum values from the aqueous solution containing dissolved molybdenum values by adjusting the pH value of the solution to between about 0.5 and about 2 and precipitating a molybdenum-containing product therefrom in the presence of dissolved ammonium values present as ammonium ion and dissolved phosphorus values present as phosphate ion, the gram atomic weight ratio of phosphorus contained in the said phosphorus values to molybdenum contained in the said molybdenum values being at least 1:15 and not more than about 1:6, the gram atomic weight ratio of nitrogen contained in the said amomnium values to molybdenum contained in the said molybdenum values being above 1:4, and separating the precipitated molybdenum-containing product from the molybdenum-barren solution.

8. The process of claim 7 wherein the gram atomic weight ratio of nitrogen contained in the said ammonium values to molybdenum contained in the said molybdenum values is at least 50:1.

9. The process of claim 7 wherein the gram atomic weight ratio of phosphorus in the said phosphorus values to molybdenum in the said molybdenum values is at least 1:12.

10. The process of claim 7 wherein the pH of the solution is about 1-1.5.

11. The process of claim 7 wherein the molybdenum-containing product is precipitated from the solution containing molybdenum values while at a temperature between about 30° C. and the boiling point.

12. The process of claim 7 wherein the said molybdenum-barren solution is intimately contacted with a quantity of the said substance containing absorbed desired metal values to strip the desired metal values therefrom.

13. The process of claim 7 wherein the desired metal values are uranium values, the gram atomic weight ratio of nitrogen contained in the said ammonium values to molybdenum contained in the said molybdenum values is at least 50:1, the gram atomic weight ratio of phosphorus in the said phosphorus values to molybdenum in the said molybdenum values is at least 1:12, the pH of the solution is about 1-1.5, and the molybdenum-containing product is precipitated from the solution containing molybdenum values while at a temperature between about 30° C. and the boiling point.

14. The process of claim 13 wherein the said molybdenum-barren solution is intimately contacted with a quantity of the said substance containing absorbed desired metal values to strip the desired metal values therefrom.

15. A process for recovering molybdenum values from aqueous solution comprising precipitating a molybdenum-containing product from an aqueous solution containing molybdenum values having a pH value greater than 2 by adjusting the pH value of the solution to between about 0.5 and about 2 while in the presence of dissolved ammonium values present as ammonium ion and dissolved phosphorous values present as phosphate ion, the gram atomic weight ratio of phosphorus contained in the said phosphorous values to molybdenum contained in the said molybdenum values being at least 1:15 and not more than about 1:6, and the gram atomic weight ratio of nitrogen contained in the said ammonium values to molybdenum contained in the said molybdenum values being above 1:4.

References Cited by the Examiner
UNITED STATES PATENTS

| | | | |
|---|---|---|---|
| 1,838,767 | 12/31 | Iredell | 23—19 |
| 3,052,513 | 9/62 | Crouse | 23—14.5 |
| 3,083,085 | 3/63 | Lewis et al. | 23—14.5 |

CARL D. QUARFORTH, *Primary Examiner.*

UNITED STATES PATENT OFFICE
CERTIFICATE OF CORRECTION

Patent No. 3,180,703

April 27, 1965

Arthur E. Ableson et al.

It is hereby certified that error appears in the above numbered patent requiring correction and that the said Letters Patent should read as corrected below.

Column 1, line 9, after "to" insert -- the --; column 3, line 12, for "a" read -- an --; line 29, after "preferably" insert -- much --; column 4, lines 2 to 5, the formula should appear as shown below instead of as in the patent:

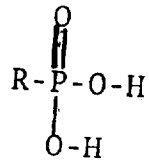

same column 4, line 59, for "0.1-1" read -- 0.8-1 --.

Signed and sealed this 21st day of September 1965.

(SEAL)
Attest:

ERNEST W. SWIDER
Attesting Officer

EDWARD J. BRENNER
Commissioner of Patents